United States Patent [19]

Dinse

[11] Patent Number: 4,657,381

[45] Date of Patent: Apr. 14, 1987

[54] MOUNTING DEVICE FOR REPRODUCTION APPARATUS

[75] Inventor: Wolfgang Dinse, Altenholz, Fed. Rep. of Germany

[73] Assignee: Dr. Ing. Rudolf Hell GmbH, Fed. Rep. of Germany

[21] Appl. No.: 251,054

[22] Filed: Apr. 6, 1981

[30] Foreign Application Priority Data

Apr. 14, 1980 [DE] Fed. Rep. of Germany ....... 3014184

[51] Int. Cl.[4] ....................... G03B 27/62; G03B 27/64

[52] U.S. Cl. ......................................... 355/76; 355/73

[58] Field of Search .............................. 355/73, 76, 77

[56] References Cited

U.S. PATENT DOCUMENTS 3,359,879 12/1967 Hamlin ................................ 355/73
3,521,538 7/1970 Escoli .................................. 355/73
3,597,078 8/1971 Miyauchi ............................. 355/73
3,677,643 7/1972 Sagawa ................................ 355/73

*Primary Examiner*—Monroe H. Hayes

[57] ABSTRACT

A mounting device for reproduction apparatus has receiving surfaces for an original copy and a recording medium. The surfaces are provided with suction holes charged by means of an underpressure. The suction holes of the receiving surfaces for the original copy and recording medium are connected to a common vacuum line, and the suction holes of at least one of the two surfaces are connected with the underpressure via a throttle.

3 Claims, 1 Drawing Figure

1 2 3 4 5 6

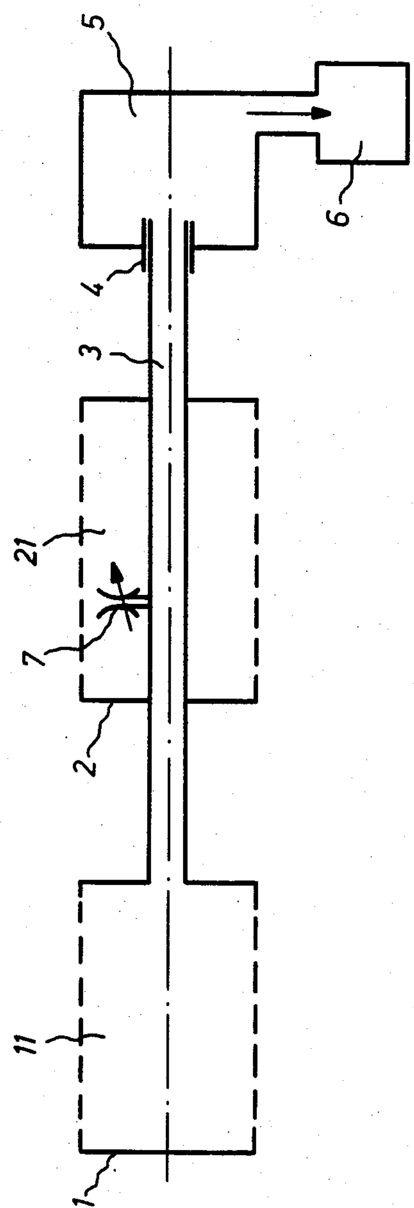
5
6
4
3
21
7
2
11
1

MOUNTING DEVICE FOR REPRODUCTION APPARATUS

BACKGROUND OF THE INVENTION

The present invention relates to a mounting device for reproduction apparatus which exhibits receiving surfaces for the original copy and the recording carrier or medium. These surfaces are provided with suction holes charged by means of a suction or underpressure.

In the case of a reproduction apparatus in which an original copy is sensed and simultaneously the reproduction is carried out on a recording carrier or medium, e.g. film, frequently hollow cylinders with suction openings are employed which are connected to an underpressure line. The underpressure suctions the original copies and the films against the cyliinder surfaces. The requirement here frequently exists that the underpressure in the one cylinder still be partially maintained even when the covering is changed on the other cylinder; i.e., the suction openings are opened. In the present conventional apparatus, accordingly, operation is carried out with two independent underpressure systems. Thus, two rotary transmissions and two pumps are necessary.

As can be easily recognized, this construction is costly.

SUMMARY OF THE INVENTION

It is an object of the present invention to produce an improved mounting device for such reproduction apparatus.

The invention achieves this by providing suction holes in the mounting surfaces for the original copy and the sensing carrier or medium which are in communication with a common vacuum line; and wherein the suction holes of at least one of the two surfaces are in communication with the underpressure line via a throttle or choke.

In an advantageous further development of the invention the throttle is designed adjustable.

BRIEF DESCRIPTION OF THE DRAWING

The drawing illustrates a basic embodiment of the invention in block diagram form.

DESCRIPTION OF THE PREFERRED EMBODIMENTS

The invention is explained in greater detail with reference to the drawing figure illustrating a preferred sample embodiment of a reproduction apparatus provided with 2 cylinders for receiving the original copy and the recording carrier or medium.

A cylinder 1, which exhibits suction openings 11, is connected via an underpressure line 3 with a cylinder 2, which likewise exhibits suction holes 21.

Underpressure line 3, at one end of the cylinders, leads via a rotary transmission 4 to a vacuum receptacle 5 which is connected to a suction pump 6 of a design well known to those skilled in the art. Within the cylinder 2 an adjustable throttle or choke 7 is provided. As soon as the suction holes 21 of the cylinder 2 are opened by removal of the original copy or of the recording carrier or medium, the air current is predominantly influenced by the throttle or choke 7 in such a manner that a sufficient underpressure is still maintained in cylinder 1, assuming a sufficient transport volume of the pump 6.

If, by contrast, the suction holes 21 of the cylinder 2 are entirely or predominantly closed, the underpressure increases to the value necessary for operation. On account of the low air feed through, the underpressure in the interior of both cylinders is then substantially equal.

The invention is not restricted to the illustrated sample embodiment of cylinders, but can likewise be employed in the case of plane suction plates as mounting surfaces, whereby only one of the mounting surfaces or also both may be provided with a throttle or choke.

The invention can be advantageously employed in the field of reproduction technology; namely, for mounting original copies and films by means of suction holes which are present in the receiving surfaces for the original copy and the recording carrier or medium. The invention leads, in a simple fashion, to a savings in apparatus construction, and can be employed in all instances in which a mounting of sheet-shaped material by means of such suction holes is provided.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A reproduction apparatus mounting device, comprising: first and second separate vacuum receptacles having a receiving surface for an original copy on the first receptacle and a receiving surface for a recording medium on the second receptacle, each of said surface being provided with suction holes; said first and second separate receptacles being arranged in communication with a common vacuum line; and adjustable throttle means for setting an amount of air flow between one of the receptacles and the common vacuum line such that when the recording medium covers suction holes of the receiving surface of one of the receptacles and the original copy covers suction holes of the receiving surface of the other receptacle, the throttle means can be adjusted to permit sufficient suction at the surface associated therewith to retain the respective recording medium or original copy thereon, and such that when the recording medium or original copy is removed therefrom the throttle means limits air flow so that sufficient suction is rectained at the other surfaces to hold the remaining original copy or recording medium thereto.

2. A device according to claim 1 wherein the first and second receptacles each comprise cylinders with suction openings in the cylindrical walls thereof; and wherein the two cylinders are concentrically mounted to the vacuum line; said vacuum connecting to a vacuum receptacle via rotary transmission means; and said throttle means being provided in the vacuum line at a location within the cylinder located most closely to the vacuum receptacle.

3. A method for mounting an original copy and a recording medium in a reproduction apparatus, comprising the steps of: providing first and second separate vacuum receptacles with associated respective receiving surfaces for the original copy or the recording medium, each of said surfaces having suction holes; charging the suction holes in both vacuum receptacles with an underpressure via a vacuum line common to both receptacles; providing an adjustable throttle to permit adjustment of underpressure fed to the suction holes of one of the two receptacles; adjusting the throttle such that when the recording medium covers suction holes of the surface of one of the receptacles and the original copy covers suction holes of the surface of the other receptacle, the throttle permits sufficient suction at the surface associated with the throttle to retain the original copy or recording medium thereon, and such that when the recording medium or original copy is removed therefrom the throttle limits air flow so that sufficient suction is retained at the other surface to hold the remaining original copy or recording medium thereto.

* * * * *